Figure 1:
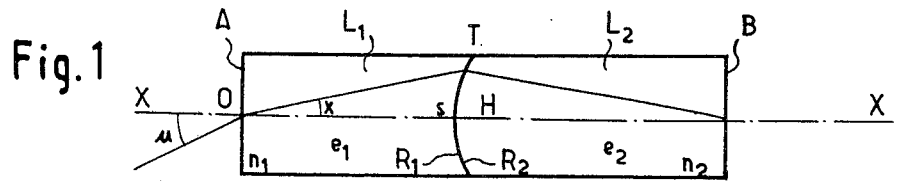

United States Patent
Bel

[11] 4,354,730
[45] Oct. 19, 1982

[54] OPTICAL RELAY USED FOR TRANSFERRING AN IMAGE FROM ONE POINT TO ANOTHER ALONG AN OPTICAL AXIS

[75] Inventor: Roger P. Bel, Vincennes, France

[73] Assignee: Metallisations et Traitements Optiques M.T.O., France

[21] Appl. No.: 162,450

[22] Filed: Jun. 24, 1980

[30] Foreign Application Priority Data

Jun. 25, 1979 [FR] France ................. 79 16266

[51] Int. Cl.³ .................................. G02B 23/00
[52] U.S. Cl. ................... 350/54; 350/96.26; 350/483
[58] Field of Search ............... 350/54, 481, 482, 483, 350/96.18

[56] References Cited

U.S. PATENT DOCUMENTS 3,060,805 10/1962 Brumley ................ 350/445

Primary Examiner—John K. Corbin
Assistant Examiner—Matthew W. Koren
Attorney, Agent, or Firm—Finnegan, Henderson, Farabow, Garrett & Dunner

[57] ABSTRACT

This optical relay is characterized in that it comprises at least one optical system formed from at least two thick optical elements, one of which is convergent and the other divergent, the index, the thickness and the radii of curvature of the optical elements being selected so that the end faces of the optical system formed thereby are conjugate.

9 Claims, 13 Drawing Figures

OPTICAL RELAY USED FOR TRANSFERRING AN IMAGE FROM ONE POINT TO ANOTHER ALONG AN OPTICAL AXIS

The present invention relates to an optical relay used for transferring an image from one point to another along an optical axis.

Optical relays known at present have very different forms going for example from the simple lens serving as a magnifying glass to complex erecting systems entering into the construction of telescopes or periscopes.

These optical relays are sometimes formed from thick optical systems. In the most simple cases, they are formed from a Stanhope magnifying lens or from a thick afocal system and are, for example, used in some types of endoscopes or in certain sights used for observation purposes. But in general, they are formed from several thick optical systems disposed after one another and comprise deflecting elements having parallel end faces, perpendicular or forming therebetween any angle, these deflecting elements being provided for breaking up the general optical axis and allowing it to extend not only in a plane but also in space.

The use of deflecting elements implies however that between each thick optical system, the beams are transferred to infinity (or substantially so) so as to avoid deformation of the images. Now, when this condition is brought about, the quality of the transferred image is affected.

The present invention proposes remedying this disadvantage and, to do this, it provides an optical relay which is characterized in that it comprises at least one optical system formed from at least two thick optical elements, one of which is convergent and the other divergent, the index, the thickness and the radii of curvature of the optical elements being selected so that the end faces of the optical system formed thereby are conjugate. Thus, when the relay comprises thick optical systems whose end faces are conjugate, there is no need to transfer the beams to infinity between each thick system, which allows the transferred image to have an improved quality.

According to different embodiments in conformity with the invention, the optical elements of the same optical system may be bonded or not. More precisely, when these elements are bonded, their bonding surfaces have the same radius of curvature. On the other hand, when they are separated by air, their facing surfaces have closely related radii of curvature.

In accordance with the invention, it is furthermore advantageous for the indices of refraction of two successive optical elements of the same system to have values differing by at least 0.01. It is furthermore desirable for the constringencies of the converging optical elements to have values greater than those of the diverging optical element and to differ therefrom by at least 1.1.

According to one particular embodiment of the invention, the relay in accordance with the invention comprises two optical systems whose interfaces are conjugate, and which are bonded at one of their end faces. In this case, the relay ensures the erection of the image.

At the present time, image conduits formed from optical fibres are widely used in industry or in medicine. Their use poses, however, problems, particularly because of their fragility which is a consequence of their flexibility.

The flexibility of the image conduits does not, however, need to be provided when the optical axis is to remain fixed. Therefore, to benefit from the advantages provided by image conduits, the present invention also relates to an optical relay which is characterized in that it comprises two optical systems whose end faces are conjugate and which are connected by an image conduit made from optical fibres.

In accordance with one variation, the image conduit is in the form of a thin plate in which the fibres are oriented perpendicularly to the faces of the two systems against which they bear. The optical fibre plate thus forms, between the two systems which it connects together, a "thin relay" the magnification of which between the associated end faces is always unitary.

In accordance with another variation, the image conduit is bent, the ends of the fibres which form it being orientated perpendicularly to the end faces of the two optical systems against which they bear. It is thus possible to bend the optical path while avoiding deformation of the image and the appearance of aberrations.

It will be noted here that the magnification of the optical fibre "relay" is always unitary and this whatever the angle formed between the two associated end faces of the two systems.

In accordance with another variation for providing directly an angular variation of the optical path, the image conduit is formed by an optical fibre plate cut into the shape of a prism, the fibres being oriented, or not, perpendicularly to the end faces of the two systems against which they bear.

With this place, it is possible to bend the optical path without meeting the problems which would appear with a conventional prism. The risks of twisting the fibres are in effect negligible in view of the thickness of the plate.

Several embodiments of the present invention will be described hereafter with reference to the accompanying drawings in which:

FIGS. 1 to 7 each show schematically an optical system forming an optical relay in accordance with the invention.

Figure 8:
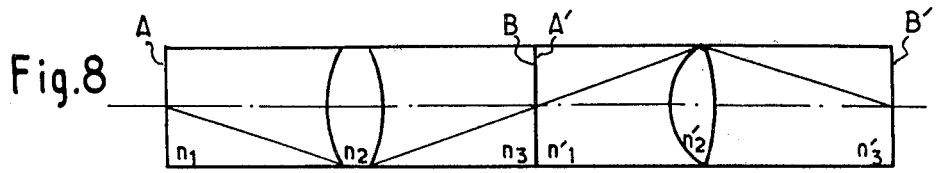

FIG. 8 shows schematically an optical relay formed from two bonded optical systems.

FIGS. 9 to 12 each show schematically an optical relay formed from two optical systems connected by an image conduit made from optical fibres.

Figure 13:
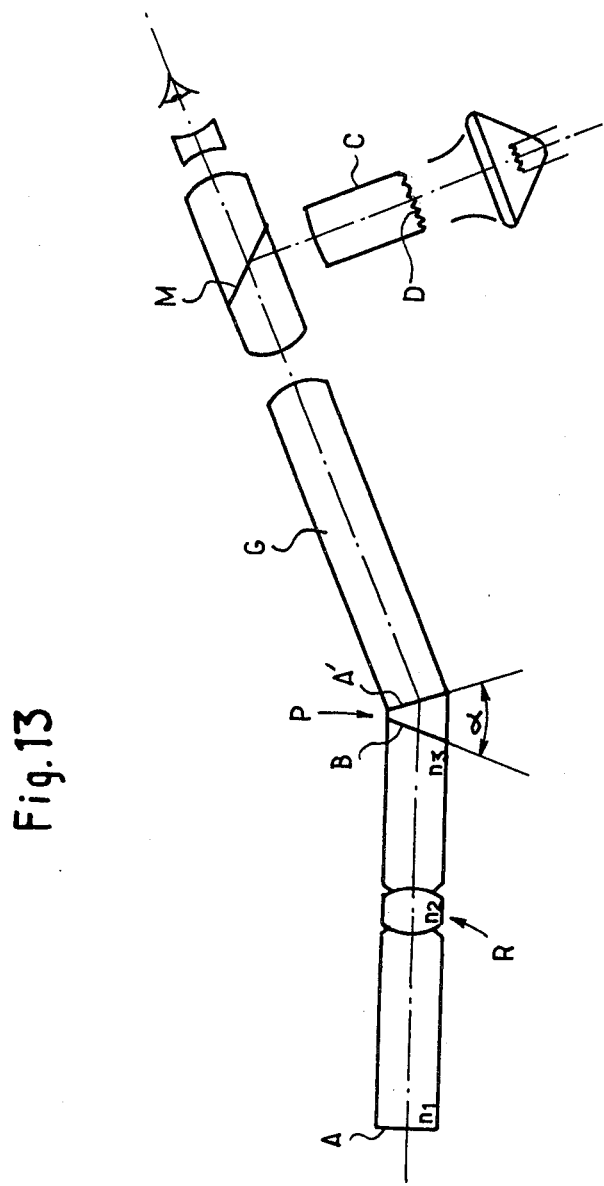

FIG. 13 shows schematically an optical relay disposed in a self-lighting endoscopic system.

The optical relay shown in FIG. 1 comprises an optical system formed from a thick diverging lens $L_1$ and a thick converging lens $L_2$. Lens $L_1$, which has a thickness $e_1$ and an index $n_1$, is formed with a flat face A perpendicular to the optical axis XX and a face having radius $R_1$ situated opposite face A. As for lens $L_2$, which has a thickness $e_2$ and an index $n_2$, it is formed in its turn with a flat face B perpendicular to the optical axis and a face having radius $R_2$ situated opposite face B.

In the example shown, radii $R_1$ and $R_2$ are equal whereas lenses $L_1$ and $L_2$ are bonded along their faces having the same radius of curvature.

In accordance with the invention, the thickness, the index and the radius of the lenses are selected so that faces A and B, which form the end faces of the optical relay, are conjugate. These different data satisfy in fact the relationship:

$$\frac{n_1}{n_2} \cdot \frac{1}{e_1} + \left(1 - \frac{n_1}{n_2}\right) \cdot \frac{1}{R_1} = \frac{1}{e_2}$$

The radius of curvature $R_1$ is then given by the relationship:

$$R_1 = \frac{e_1 e_2 (n_2 - n_1)}{n_2 e_1 - n_1 e_2}$$

Let us now consider the light ray shown in FIG. 1. It satisfies the conventional relationship:

$$\text{Sin } u = n_1 \text{ Sin } x$$

When $SH = TH \simeq R_1$ and when angle x assumes its maximum value, tan x which is equal to $TH/(OS+SH)$ becomes:

$$\tan x \simeq R_1/(R_1 + e_1)$$

Now, since angle x is relatively small with respect to the thickness $e_1$, it may be admitted that its maximum value is given by the relationship:

$$x = R_1/(R_1 + e_1)$$

It follows that the resulting numerical aperture u which is given by the formula:

$$\text{Sin } u = n_1 \text{ Sin } \frac{R_1}{R_1 + e_1}$$

depends on the value of the radius of curvature $R_1$ of the bonding surface of lenses $L_1$ and $L_2$.

The table below gives by way of example a few values which may be suitably given to radius $R_1$ for faces A and B to be conjugate, the thicknesses $e_1$ and $e_2$ being respectively equal to 50 and 70 whereas the indices $n_1$ and $n_2$ each have four different values.

| $e_1 = 50$ | $n_1 = 1.49$ | 1.51680 | 1.56883 | 1.62004 |
|---|---|---|---|---|
| $e_2 = 70$ | $n_2 = 1.92$ | 1.62004 | 1.57444 | 1.51680 |
| $R_1$ | 7.514 | 1.9304 | 0.1041 | −1.9094 |

It follows from this table that it will in general be advantageous to use pairs of lenses $L_1$ and $L_2$ whose indices differ by at least 0.01. It is clear that such a difference of indices will require, to ensure conjugation, a very small radius of curvature. The more this difference increases, the greater the radius of curvature becomes and so the higher will be the numerical aperture.

For the sake of completeness, it should be noted here that the magnification at which the optical relay shown in FIG. 1 works is defined by the expression:

$$g = \frac{e_2 \cdot n_2}{e_1 \, n_1}$$

Figure 2:
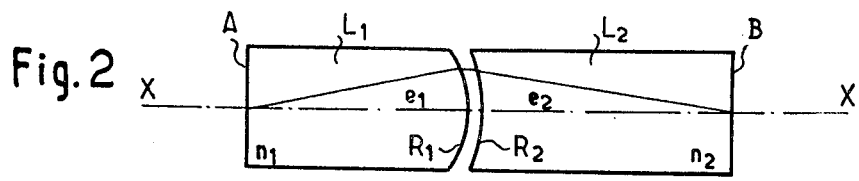
Figure 3:
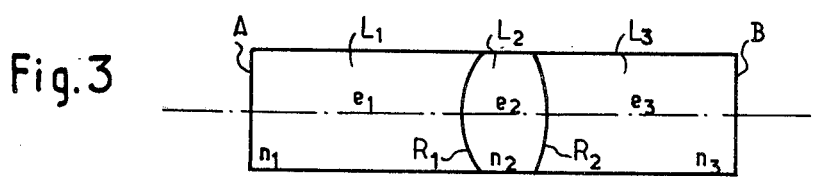

The optical relay shown in FIG. 2 comprises a thick optical system formed from two lenses $L_1$ and $L_2$ which are not bonded and whose radii $R_1$ and $R_2$ are colsely related. The condition for which its end faces A and B are conjugated is still satisfied when:

$$R_1 = \frac{e_1 e_2 (n_2 - n_1)}{n_2 e_1 - n_1 e_2}$$

Figure 4:
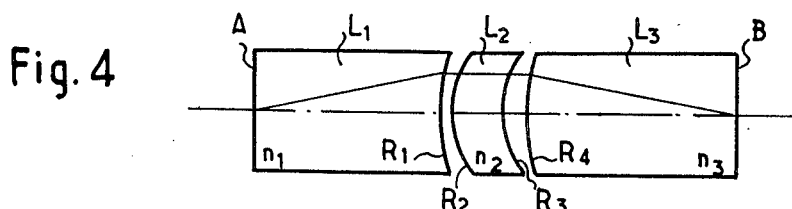
Figure 5:
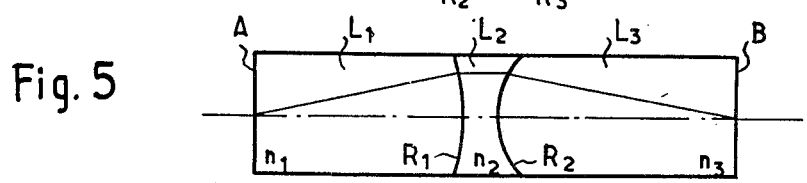
Figure 6:
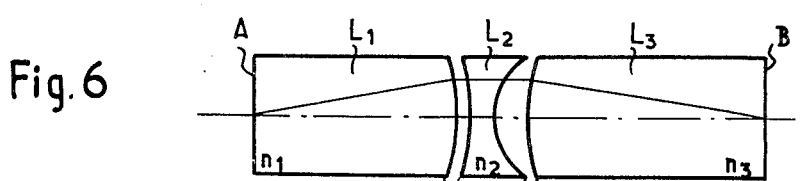

The optical relays shown in FIGS. 3 to 6 each comprise a thick optical system formed from three lenses $L_1$, $L_2$, $L_3$ which may be bonded (FIGS. 3 and 5) or slightly spaced apart (FIGS. 4 and 6). By way of examples, which are in no wise limiting, there will be found in the table below four series of values which, when they are taken by $e_1$, $e_2$, $e_3$, $n_1$, $n_2$, $n_3$, $R_1$ and $R_2$, enable conjugation of the end faces A and B of an optical system formed from three bonded lenses to be ensured.

| $e_1$ | $e_2$ | $e_3$ | $n_1$ | $n_2$ | $n_3$ | $R_1$ | $R_2$ |
|---|---|---|---|---|---|---|---|
| 40 | 10 | 50 | 1.5178 | 1.62004 | 1.56883 | 2.723 | −1.581 |
| 80 | 5 | 40 | 1.4921 | 1.69004 | 1.9200 | 10.613 | 5.443 |
| 35 | 10 | 45 | 1.69004 | 1.4921 | 1.5168 | −4.099 | 0.745 |
| 30 | 5 | 50 | 1.5168 | 1. | 1.69004 | −10.222 | 20.415 |

Figure 7:
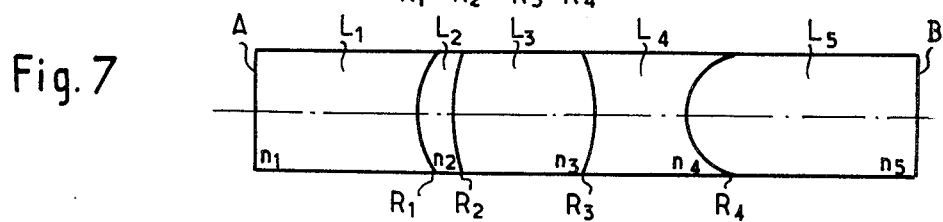

The optical relay shown in FIG. 7 comprises a thick optical system formed from five lenses, the number of these lenses could however be greater as long as the conjugation of faces A and B is ensured.

The optical relay shown in FIG. 8 comprises two thick optical systems bonded to each other. Their end faces (A,B) respectively (A'B') are conjugate, so that between each of them, the transfer of the image is ensured otherwise than by a transfer to infinity.

It should be noted here that the relay of FIG. 8 transfers an erected image.

Figure 9:
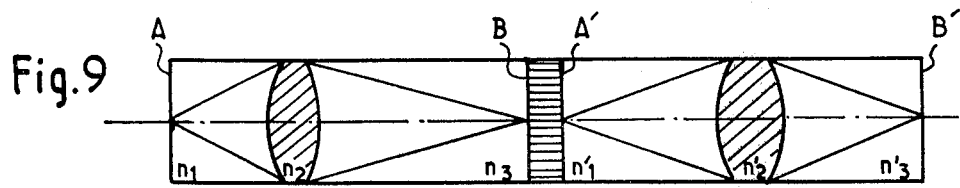

The optical relay shown in FIG. 9 comprises two thick optical systems whose end faces (A,B; A'B') are conjugate, and an optical fibre plate placed between faces B and A'. The optical fibre plate, which forms a "thin relay" whose magnification is unitary betwen faces B and A', ensures, between the two conjugate faces of each system, a connection avoiding transfer to infinity of the beams.

Figure 10:
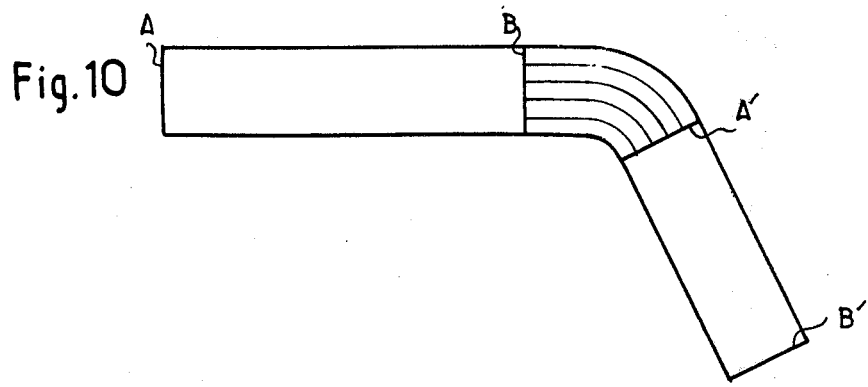

The relay shown in FIG. 10 comprises two thick optical systems whose end faces (A, B; A'B') are conjugate, and an image conduit made from optical fibres placed between faces B and A'. The conduit is bent whereas the ends of its fibres are orientated respectively perpendicularly to faces B and A' against which they bear. Forming a relay whose magnification between faces B and A' is always unitary, and this whatever the angle formed between these two faces, the conduit allows the optical axis to be bent without there appearing the problems which are usually met with when using a conventional prism.

Figure 11:
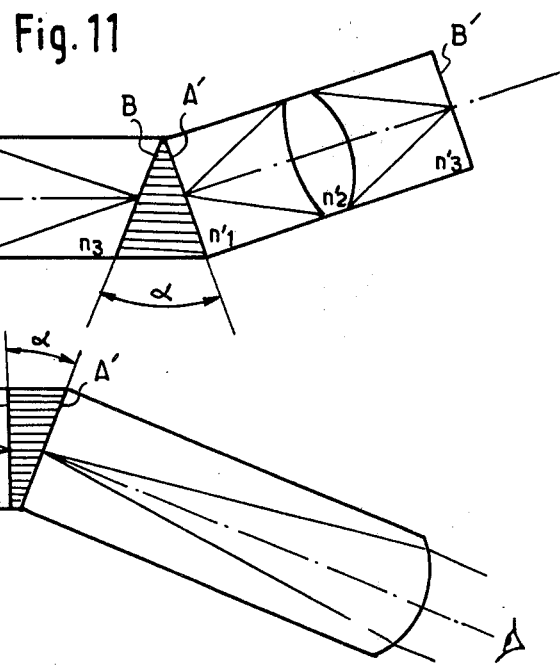
Figure 12:
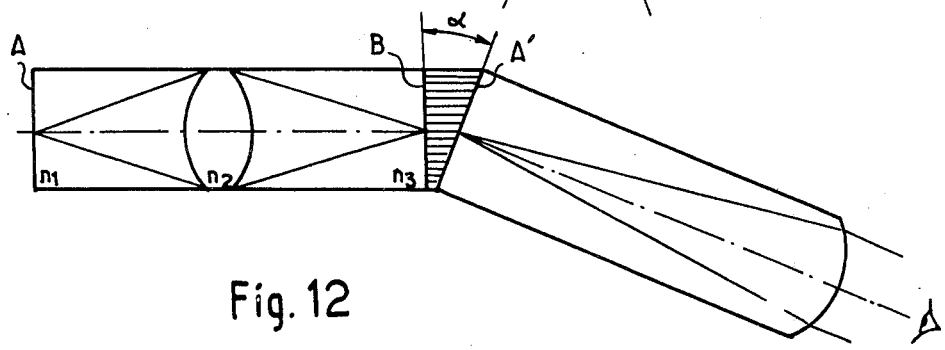

The relays shown in FIGS. 11 and 12 comprise two thick optical systems whose end faces (A, B; A', B') are conjugate, and an optical fibre plate cut into the shape of a prism, this plate being placed between faces B and A'. It should be noted that the fibres may or may not be orientated perpendicularly to faces B and A'.

With the plate cut into the shape of a prism, it is still possible to bend directly the optical axis without meeting the problems appearing with a conventional prism. In fact, the risks of twisting the fibres are negligible in view of the thickness to be used.

The image of face A, which is formed on face B, is transferred by the plate to face A' with, it is true, an anamorphosis due to the value α of the angle of the prism. This anamorphosis, proportional to $1/\cos \alpha$ is, however, not of a nature to supplant the definition $d\phi$ of the image which is given by the relationship:

$d\phi = 1.221/2n \sin u$

In fact, sin u is always such that $d\phi$ is much greater than the diameter of the optical fibres used. Since the fibres used have in practice a diameter of the order of 6 μm and sin u scarcely exceeds 0.2, $d\phi = 0.0005/0.4 = 0.015$ μm this value being much greater than an anamorphosis due to a 30° deflection for example.

FIG. 13 shows an optical relay in accordance with the invention used in the construction of a self-lighting endoscope. This relay comprises a thick optical system R formed from three elements and whose end faces A and B are conjugate, a guide G which is just a Stanhope magnifying glass, and a prism P cut from a plate of optical fibres orientated perpendicularly to face B of the optical system R and to face A' of the Stanhope magnifying lens.

The image of A, forming at B is taken up by face A', then transferred to infinity on exiting from the magnifying lens.

The endoscope comprises furthermore a second Stanhope magnifying glass C whose flat face D is dulled. This face is conjugate with the bonding face A' and, by means of seim-transparent mirror M, the conjugation (D, A') ensures by relay R the lighting of face A.

It will be noted that the optical relays in accordance with the invention could also be used as laser beam vehicles.

I claim:

1. An optical relay used for transferring an image from one point to another along an optical axis comprising two optical systems each formed from at least two thick optical elements, one of which is convergent and the other divergent, the index, thickness and the radii of curvature of the optical elements being selected so that the end faces of each of the optical systems formed thereby are conjugate, said systems being connected together by an image conduit of optical fibers which bear against one end face of each of the systems.

2. The optical relay of claim 1, wherein the optical elements of at least one of the optical systems are bonded, their bonding surfaces have the same radius of curvature.

3. The optical relay of claim 1, wherein the optical elements of at least one of the optical systems are spaced apart, whereas their adjacent faces have closely related radii of curvature.

4. The optical relay of claim 1, wherein the indices of refraction of two successive optical elements of any one system have values differing by at least 0.01.

5. The optical relay of claim 1, wherein the constringencies of the converging optical elements have values greater than those of the diverging optical elements and differ therefrom by at least 1.1.

6. The optical relay of claim 1, wherein the image conduit is in the form of a thin plate in which the fibers are oriented perpendicularly to the end faces of the two optical systems against which they bear.

7. The optical relay of claim 1, wherein the image conduit is bent, the ends of the fibers which form it being orientated perpendicularly to the end faces of the two optical systems against which they bear.

8. The optical relay of claim 1, wherein the image conduit is formed by an optical fiber plate cut out in the shape of a prism.

9. A self-lighting endoscopic system comprising an endoscope having the optical relay of claim 1.

* * * * *